(12) United States Patent
Hirama (10) Patent No.: US 11,831,828 B2
(45) Date of Patent: Nov. 28, 2023

(54) PRINTER

(71) Applicant: Seiko Instruments Inc., Chiba (JP)

(72) Inventor: Toshihiro Hirama, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 18/187,476

(22) Filed: Mar. 21, 2023

(65) Prior Publication Data
US 2023/0308572 A1 Sep. 28, 2023

(30) Foreign Application Priority Data

Mar. 23, 2022 (JP) ................................. 2022-046292

(51) Int. Cl.
*H04N 1/00* (2006.01)

(52) U.S. Cl.
CPC ..... *H04N 1/00907* (2013.01); *H04N 1/00538* (2013.01); *H04N 1/00557* (2013.01); *H04N 1/00559* (2013.01)

(58) Field of Classification Search
CPC .... H01R 13/447; H01R 31/06; H04B 7/2609; H04B 1/40; H04B 2001/045; H04B 1/3877; H04B 1/3816; H04B 1/3833; H04B 10/29; H04B 10/40; H04B 17/11; H04B 17/21; H04B 2001/3894; H04B 7/0413; H04B 7/0452; G08C 17/02; G08C 19/00; G05B 23/02; H04N 7/181; H04N 7/102; H04N 23/57; H04N 5/77; H04N 23/51;

(Continued)

(56) References Cited

U.S. PATENT DOCUMENTS 5,122,005 A 6/1992 Kamei
5,169,332 A * 12/1992 Cooke ................ H01R 13/6395
439/372

(Continued)

FOREIGN PATENT DOCUMENTS

JP 2009-224088 A 10/2009
JP 2011-142057 A 7/2011

OTHER PUBLICATIONS

Extended European Search Report in Europe Application No. 23162858.7, dated Aug. 7, 2023, 22 pages.

*Primary Examiner* — Negussie Worku
(74) *Attorney, Agent, or Firm* — Crowell & Moring LLP (57) ABSTRACT

A printer includes: a board including a connector unit that includes at least a power supply connector into which a power cable is to be removably inserted; and a housing including: a housing main body that accommodates the board and includes a cable connection groove through which the power cable is inserted in an inserting and removing direction of the power cable; and a connector cover configured to cover the cable connection groove, wherein the connector cover includes: a cover main body including a power supply opening portion passing through the cover main body in the inserting and removing direction, and a first interface opening portion passing through the cover main body in the inserting and removing direction; and a first opening cover portion configured to cover at least a part of the first interface opening portion, wherein the first opening cover portion includes a first coupling portion configured to couple the first opening cover portion and the cover main body to each other.

14 Claims, 8 Drawing Sheets

(58) Field of Classification Search
CPC ...... H04N 23/55; H04N 23/661; H04N 23/54;
H04N 5/92; H04N 7/015; H04N 7/04;
H04N 7/10; H04N 23/555; H04N
1/00538; H04N 1/00541; H04N 1/04;
H04N 1/107; H04N 1/12; H04N 1/193;
H04N 23/50; H04N 5/44; H04N 5/60;
H04N 7/01; H04N 7/106; H04N 7/188;
H04N 9/8042; H04N 1/00; H04N
1/00127; H04N 1/00161; H04N 1/00167;
H04N 1/00204; H04N 1/00209; H04N
1/00307; H04N 1/00352; H04N 1/00384;
H04N 1/00397; H04N 1/00405; H04N
1/0049; H04N 1/00525; H04N 1/00551;
H04N 1/1017; H04N 1/1026; H04N
1/128; H04N 1/1911; H04N 1/2112;
H04N 21/4143; H04N 21/4627; H04N
2101/00; H04N 2201/0027; H04N
2201/0044; H04N 2201/0049; H04N
2201/0051; H04N 2201/0055; H04N
2201/0062; H04N 2201/0084; H04N
2201/0086; H04N 2201/0087; H04N
2201/0089; H04N 2201/0096; H04N
2201/33378; H04N 23/11; H04N 23/56;
H04N 23/63; H04N 23/633; H04N 23/74;
H04N 25/76; H04N 5/30; H04N 5/74;
H04N 7/104; H04N 7/183; H04N 9/3141
USPC .................................................. 358/305, 1.15
See application file for complete search history.

(56) References Cited

U.S. PATENT DOCUMENTS

| | | | | |
|---|---|---|---|---|
| 5,359,654 A | * | 10/1994 | Jensen | H04Q 1/028 |
| | | | | 379/88.16 |
| 7,837,484 B2 | | 11/2010 | Wu | |
| 2011/0007483 A1 | * | 1/2011 | Li | G06F 1/186 |
| | | | | 361/752 |
| 2011/0173364 A1 | * | 7/2011 | Tsugaru | H01R 31/06 |
| | | | | 710/302 |
| 2011/0231032 A1 | * | 9/2011 | Matsumura | H05K 5/0065 |
| | | | | 701/1 |
| 2019/0094922 A1 | * | 3/2019 | Xu | H05K 5/026 |

* cited by examiner

PRINTER

RELATED APPLICATIONS

This application claims priority to Japanese Patent Application No. 2022-046292 filed on Mar. 23, 2022, the entire content of which is incorporated herein by reference.

BACKGROUND OF THE INVENTION

1. Field of the Invention

The present invention relates to a printer.

2. Description of the Related Art

Hitherto, for a circuit board accommodated in a housing of a printer, a power supply connector has been used in order to enable electric power to be supplied (power supply) from a power supply device such as an AC power supply device so as to operate the printer. Further, in general, an interface connector is used in order to enable transmission and reception of an electric signal from an external device. (See, for example, Japanese Patent Application Laid-open No. 2011-142057).

However, in a case of a device like the above-mentioned related-art printer, which is compatible with a board allowing a plurality of interface connectors to be mounted on the board, it is required that a connector cover being an exterior component be set in accordance with the connectors mounted on the board. In this case, one connector cover can be employed when a plurality of opening portions are formed in the one connector cover in advance so that cables to be connected to the connectors can be inserted through the plurality of opening portions. However, an opening portion, through which a cable is not inserted, allows entry of, for example, dust and dirt into the printer. Therefore, it has been required to separately and additionally provide a cover for covering the opening portion, or to prepare a connector cover in which the opening portion through which a cable is not inserted is covered during manufacture.

The present invention has been made in view of the above-mentioned circumstances, and has an object to provide a printer capable of preventing entry of dust and dirt into the printer with a cover that is compatible with a plurality of interfaces.

SUMMARY OF THE INVENTION

According to one embodiment of the present invention, there is provided printer including: a board including a connector unit that includes at least a power supply connector into which a power cable is to be removably inserted; and a housing including: a housing main body that accommodates the board and includes a cable connection groove through which the power cable is inserted in an inserting and removing direction of the power cable; and a connector cover configured to cover the cable connection groove, wherein the connector cover includes: a cover main body including a power supply opening portion passing through the cover main body in the inserting and removing direction, and a first interface opening portion passing through the cover main body in the inserting and removing direction; and a first opening cover portion configured to cover at least a part of the first interface opening portion, wherein the first opening cover portion includes a first coupling portion configured to couple the first opening cover portion and the cover main body to each other.

In the above-mentioned printer according to the one embodiment of the present invention, wherein the connector unit further includes an interface connector into which an interface cable is removably inserted in the inserting and removing direction, and wherein the cover main body of the connector cover further includes a second interface opening portion passing through the cover main body in the inserting and removing direction.

In the above-mentioned printer according to the one embodiment of the present invention, wherein, from the second interface opening portion, a second opening cover portion configured to cover the second interface opening portion formed in the connector cover is removed during manufacture, and wherein, through the second interface opening portion, the interface connector is exposed when seen from the inserting and removing direction.

In the above-mentioned printer according to the one embodiment of the present invention, wherein the connector unit is arrayed on one side of the board close to the cover main body and along the one side.

In the above-mentioned printer according to the one embodiment of the present invention, wherein the power supply connector is exposed through the power supply opening portion when seen from the inserting and removing direction.

In the above-mentioned printer according to the one embodiment of the present invention, wherein the connector cover includes at least two first interface opening portions and at least two first opening cover portions.

In the above-mentioned printer according to the one embodiment of the present invention, wherein the first coupling portion includes a thin portion having a smaller thickness in the inserting and removing direction than other portions of the first coupling portion.

In the above-mentioned printer according to the one embodiment of the present invention, wherein the first coupling portion is split from the thin portion when an external force is applied to the first opening cover portion.

In the above-mentioned printer according to the one embodiment of the present invention, wherein no cover is provided for covering the power supply opening portion.

In the above-mentioned printer according to the one embodiment of the present invention, wherein the first opening cover portion includes a stopper that is engaged with an edge portion of the board when an external force is applied to the first opening cover portion to an insertion side in the inserting and removing direction.

In the above-mentioned printer according to the one embodiment of the present invention, wherein the stopper and the first coupling portion are formed on both sides of the first opening cover portion across a center axis passing a center of the first opening cover portion.

In the above-mentioned printer according to the one embodiment of the present invention, wherein the first opening cover portion includes two or more first coupling portions.

In the above-mentioned printer according to the one embodiment of the present invention, wherein the first opening cover portion further includes a second coupling portion configured to couple the first opening cover portion and the cover main body to each other, and wherein the first coupling portion and the second coupling portion are formed on both sides of the first opening cover portion across the center axis passing the center of the first opening cover portion.

In the above-mentioned printer according to the one embodiment of the present invention, wherein the first opening cover portion is formed so as to be larger than the first interface opening portion, and formed so as to overlap the entire first interface opening portion when seen from the inserting and removing direction.

DETAILED DESCRIPTION OF THE PREFERRED EMBODIMENTS

An embodiment of the present invention is described with reference to FIG. 1 to FIG. 8. In the embodiment and modification examples described below, corresponding configurations are denoted by the same reference symbols, and description thereof is omitted in some cases. In the following description, expressions such as "parallel", "orthogonal", "center", and "coaxial", which express relative or absolute arrangement, not only represent such arrangement in the strict sense of the word, but also represent a relatively displaced state with an angle or a distance that falls within tolerance or achieves the same function.

[Printer 1]

Figure 1:
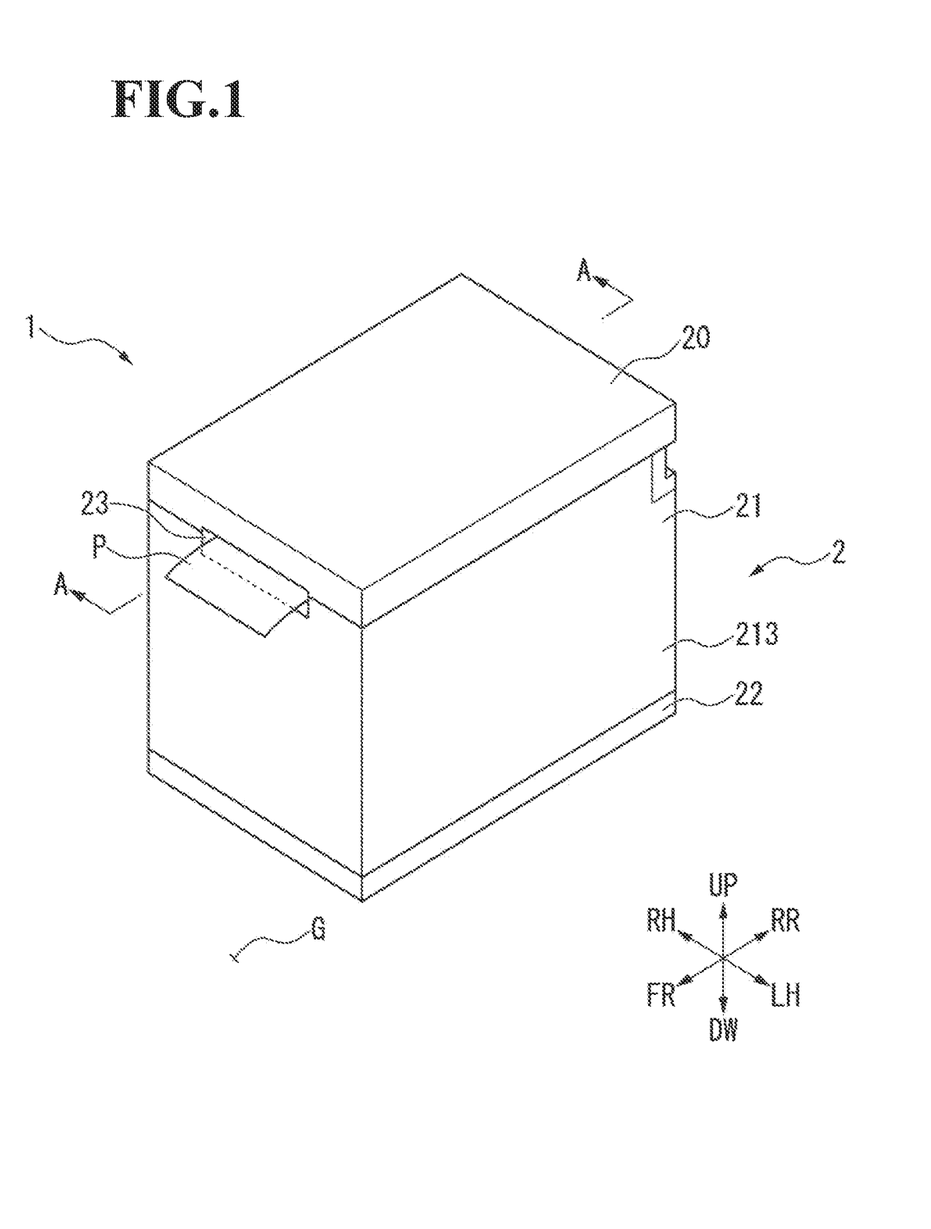
FIG. 1 is a perspective view for illustrating a printer according to an embodiment of the present invention.
Figure 2:
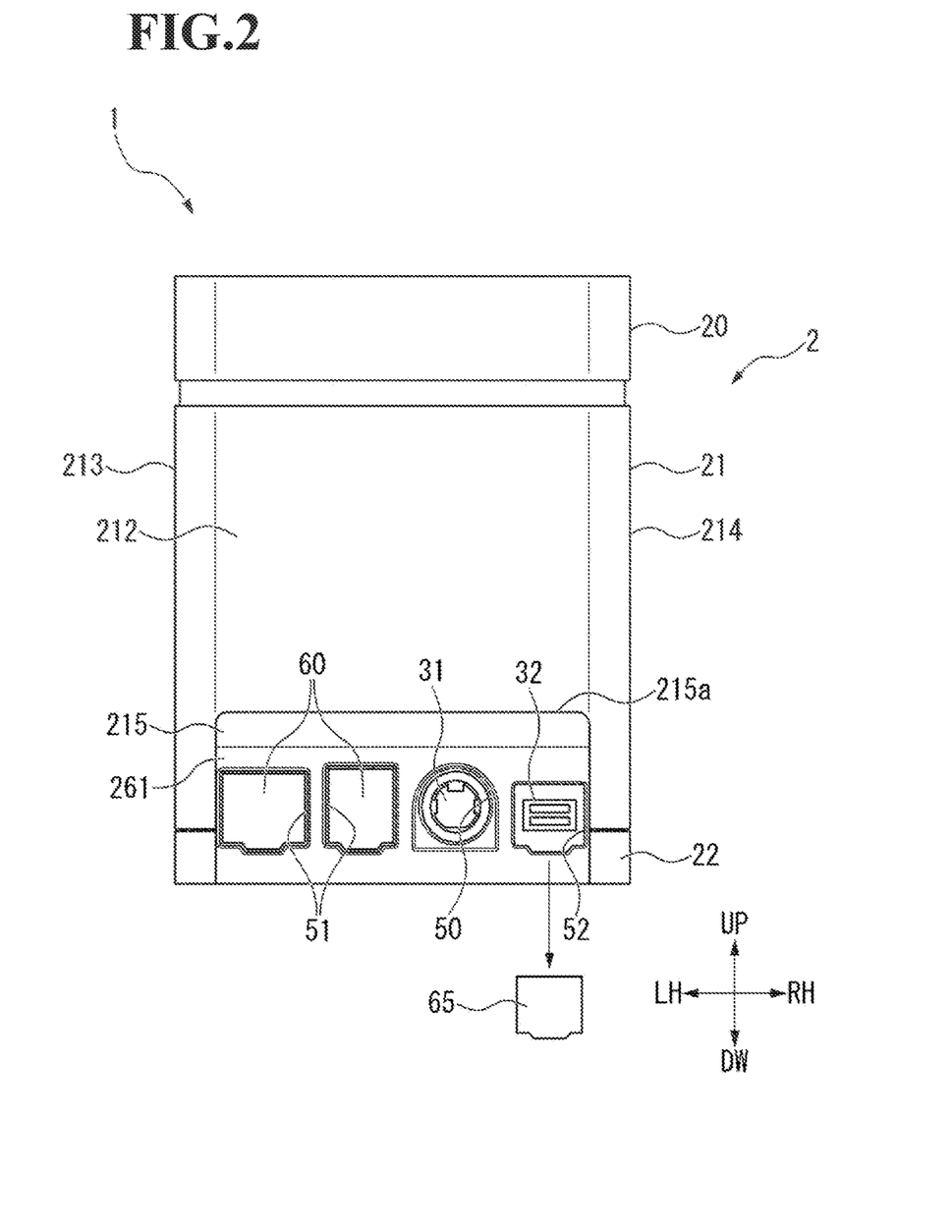
FIG. 2 is a side view for illustrating the printer when seen from a rear side thereof.
Figure 3:
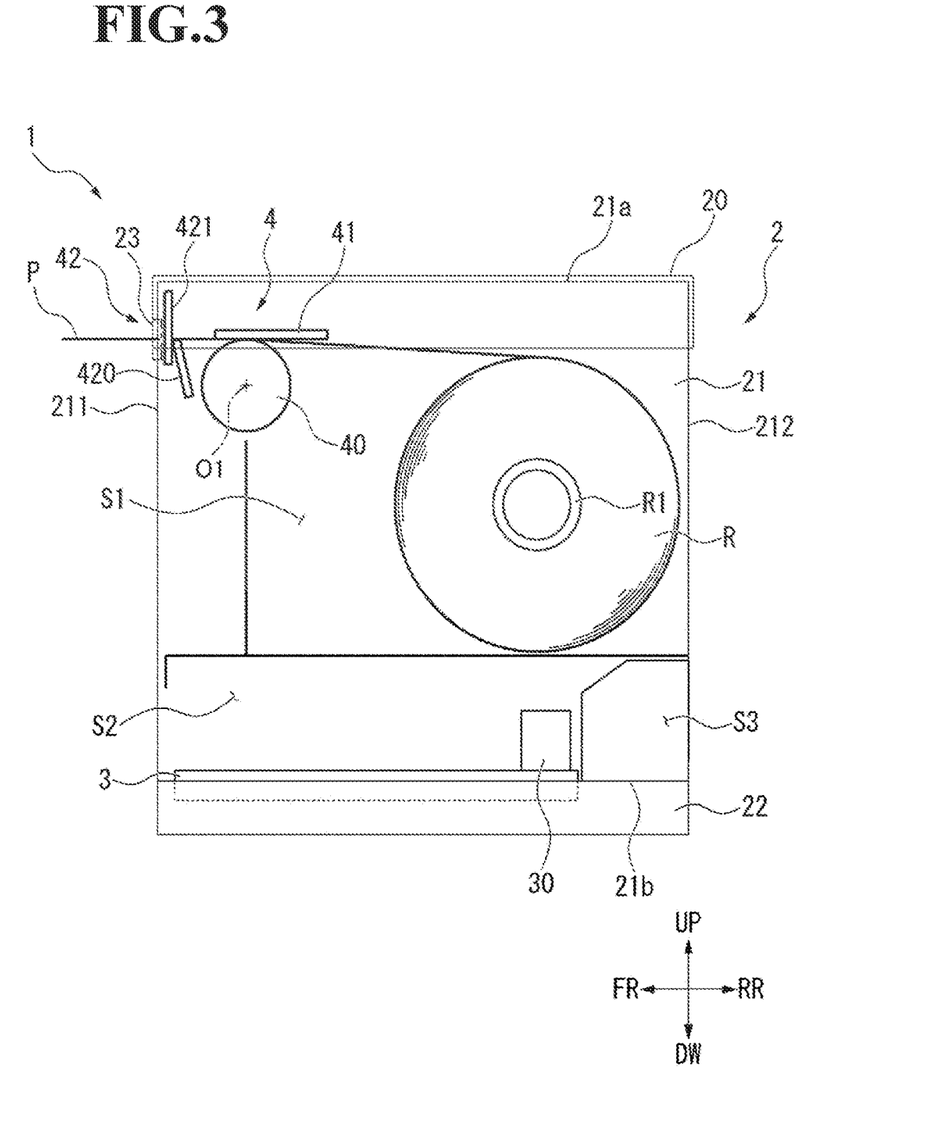
FIG. 3 is a sectional side view for illustrating an internal configuration of the printer taken along the line A-A of FIG. 1.
Figure 4:
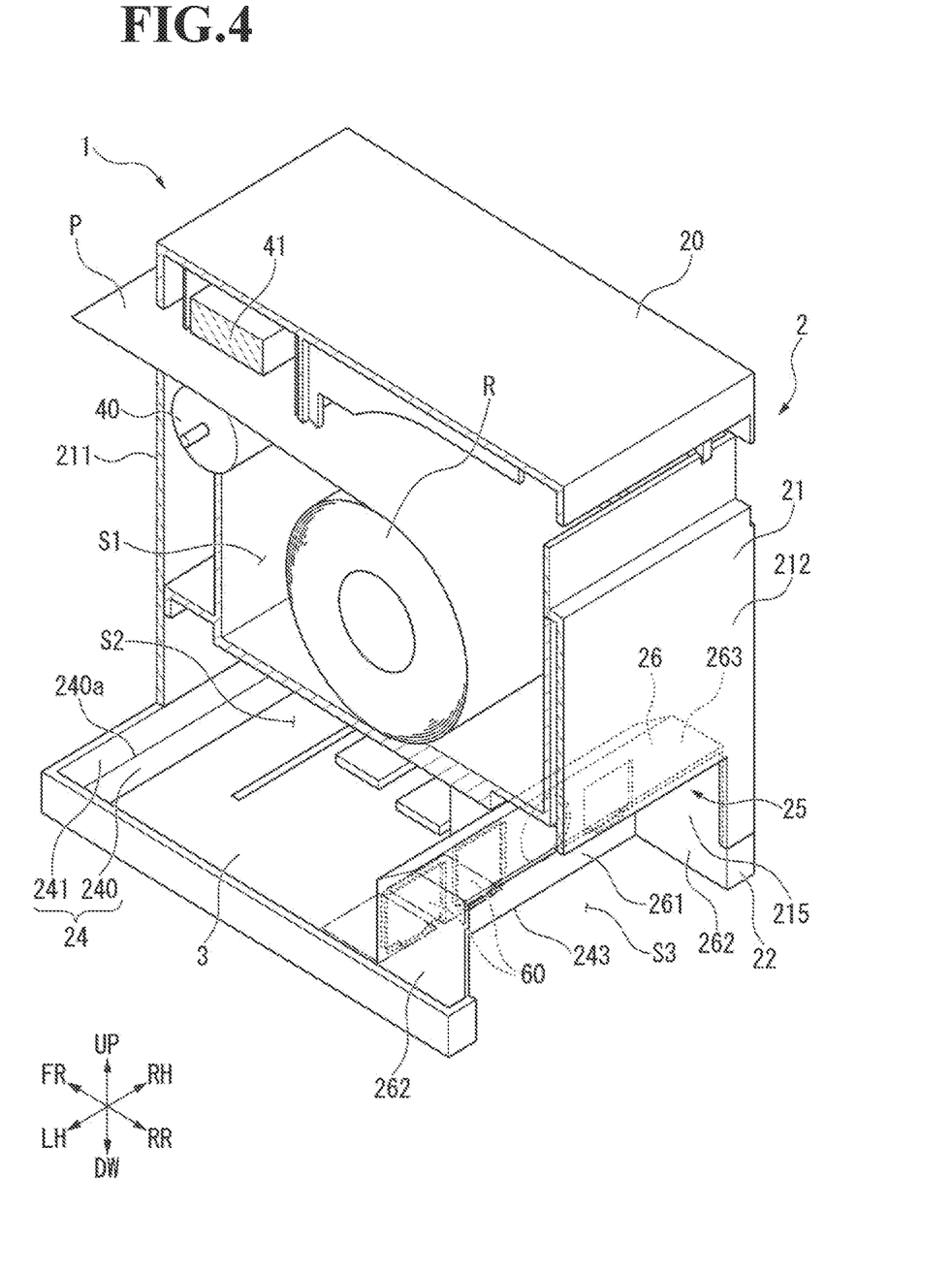
FIG. 4 is a sectional perspective view for illustrating the internal configuration of the entire printer taken along the line A-A of FIG. 1 at portions other than a lower cover and a board of the printer.

FIG. 1 is a perspective view for illustrating a printer 1 according to an embodiment of the present invention. FIG. 2 is a side view for illustrating the printer 1 when seen from a rear side RR thereof. FIG. 3 is a sectional side view for illustrating an internal configuration of the printer 1 taken along the line A-A of FIG. 1. FIG. 4 is a sectional perspective view for illustrating the internal configuration of the entire printer 1 taken along the line A-A of FIG. 1 at portions other than a lower cover 22 and a board 3 of the printer 1.

In this embodiment, the printer 1 is a thermal printer that performs printing on a recording sheet P through heat. The printer 1 performs printing on the recording sheet P. The recording sheet P in this embodiment is, for example, a heat sensitive roll sheet to be used for a thermal printing system. Under a state in which a print surface of the recording sheet P is directed outward, the recording sheet P is wound around a tubular core material R1 (see FIG. 3), thereby forming a roll sheet R. The roll sheet R may have a configuration without the core material R1. As illustrated in FIG. 1, the printer 1 includes a casing (housing) 2, the board 3, and a printing unit 4.

Here, the printer 1 is placed on a placement surface G. In the following description, a direction perpendicular to the placement surface G is referred to as an up-and-down direction. An upper side in the up-and-down direction is referred to as an upper side UP, and a side opposite to the upper side UP is referred to as a lower side DW. Further, a direction in which the recording sheet P is to be conveyed, which is orthogonal to the up-and-down direction, is referred to as a front-and-rear direction. One side in the front-and-rear direction on which the recording sheet P is to be delivered from the printer 1 is referred to as a front side FR, and a side opposite to the front side FR is referred to as a rear side RR. Further, a direction orthogonal to the up-and-down direction and the front-and-rear direction is referred to as a right-and-left direction. One side in the right-and-left direction is referred to as a left side LH, and a side opposite to the left side LH is referred to as a right side RH.

[Casing (Housing) 2]

The casing (housing) 2 is formed into a box shape. The casing 2 accommodates, in an accommodation space thereof, the board 3 and the printing unit 4. It is preferred that the casing 2 define the accommodation space in a hermetic manner so as to protect the board 3 and the printing unit 4 from, for example, moisture and dust. The casing 2 includes an upper cover 20, a housing main body 21, and the lower cover 22.

[Upper Cover 20]

As illustrated in FIG. 3, the upper cover 20 opens and closes an upper-end opening portion 21a of the housing main body 21. Specifically, the upper cover 20 is formed into a box shape opened to the lower side DW, and has the same shape as that of the housing main body 21 in plan view. In a closing position, the upper cover 20 is superposed on the housing main body 21 from the upper side UP, and closes the upper-end opening portion 21a of the housing main body 21. Further, in this state, a delivery slot 23 is defined between the housing main body 21 and the upper cover 20. The delivery slot 23 allows communication between an inside and an outside of the casing 2, and has a slit shape extending in the right-and-left direction. Through the delivery slot 23, the recording sheet P having been subjected to printing by the printing unit 4 is delivered toward the front side FR. Meanwhile, in an opening position, the upper cover 20 retreats from an upper side of the housing main body 21, and opens the upper-end opening portion 21a of the housing main body 21.

[Housing Main Body 21]

As illustrated in FIG. 2 to FIG. 4, the housing main body 21 includes the upper-end opening portion 21a on the upper side UP, and a lower-end opening portion 21b on the lower side DW. The housing main body 21 is formed into a bottomless box shape including a front wall 211 and a rear wall 212 in the front-and-rear direction and including a left wall 213 and a right wall 214 in the right-and-left direction. The front wall 211, the rear wall 212, the left wall 213, and the right wall 214 are each a part of an outer wall of the housing main body 21.

The front wall 211 is provided on the front side FR of the housing main body 21. The rear wall 212 is provided on the rear side RR of the housing main body 21. The front wall 211 and the rear wall 212 have substantially the same size and shape, and are each a plate-like member arranged along a horizontal plane defined in the up-and-down direction and the right-and-left direction. The left wall 213 is provided on the left side LH of the housing main body 21. The right wall 214 is provided on the right side RH of the housing main body 21. The left wall 213 and the right wall 214 have substantially the same size and shape, and are each a plate-like member arranged along a horizontal plane defined in the up-and-down direction and the front-and-rear direction.

In this embodiment, the housing main body 21 includes a cable connection groove 215 formed in the rear wall 212. The cable connection groove 215 is formed on the lower side DW of the rear wall 212. The cable connection groove 215 allows, for example, a power cable 71 or an interface cable 72 (see FIG. 5) to be inserted therethrough in the front-and-rear direction. A width of the cable connection groove 215 in the right-and-left direction is not particularly limited. In this embodiment, the cable connection groove 215 has a width that allows insertion of the above-mentioned cables, and prevents all of a plurality of opening portions of an opening cover mounting portion 261 of a connector cover 25 to be described later from overlapping the cable connection groove 215.

Here, the power cable 71 or the interface cable 72 can be inserted into a connector unit 30 of the board 3 from the rear side RR to the front side FR in the front-and-rear direction and removed from the connector unit 30 of the board 3, that is, the power cable 71 or the interface cable 72 is removably inserted into the connector unit 30. The front-and-rear direction substantially matches a direction of inserting and removing the cable.

[Lower Cover 22]

Figure 5:
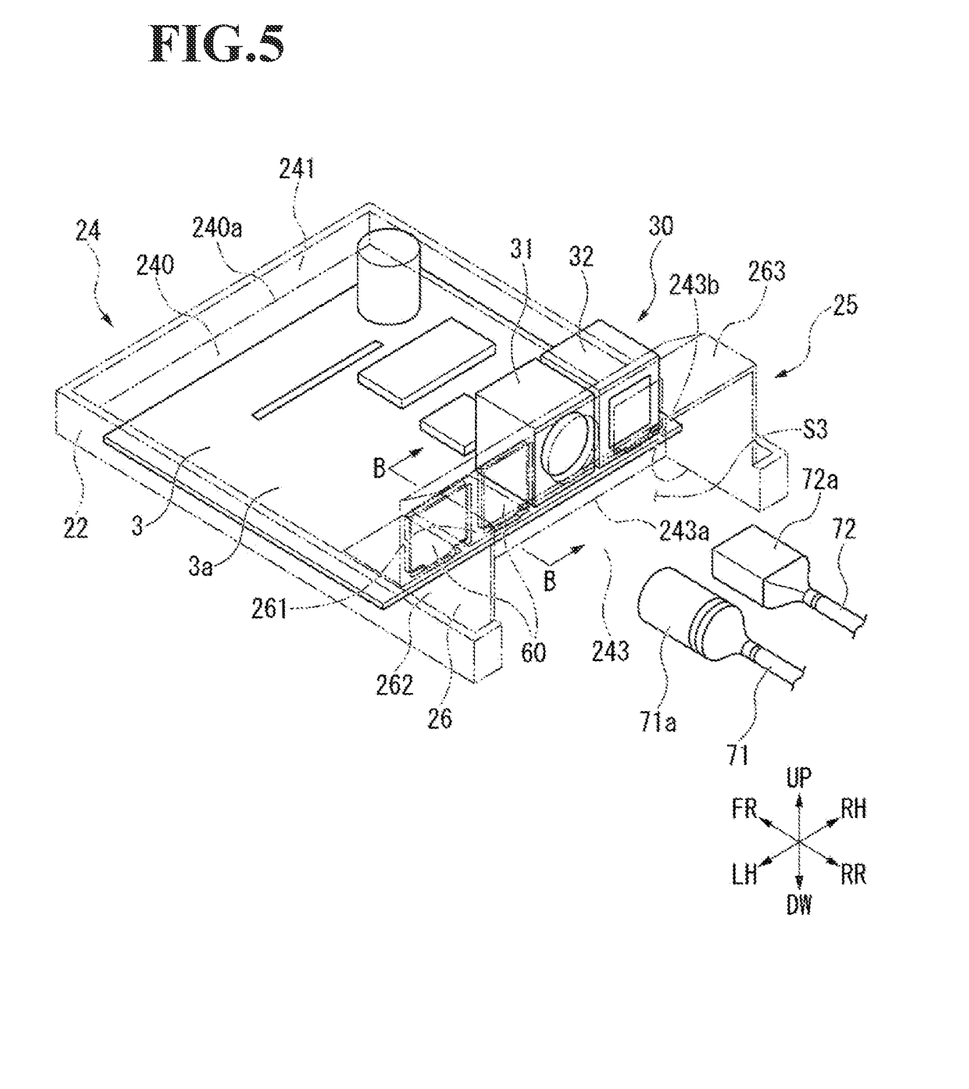
FIG. 5 is a perspective view for illustrating the lower cover and the board in a state of the printer illustrated in FIG. 4.
Figure 6:
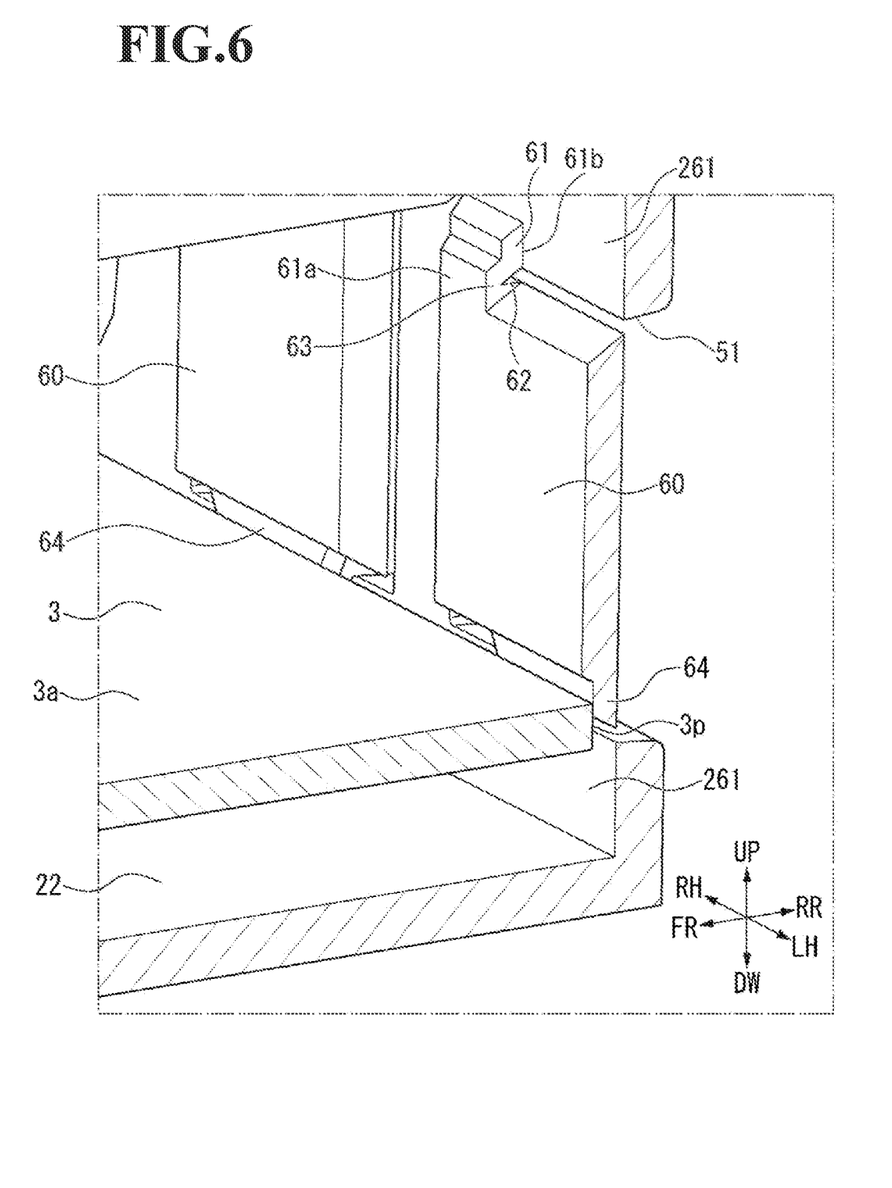
FIG. 6 is a sectional perspective view for illustrating a state of the lower cover and the board taken along the line B-B of FIG. 5 and seen from a front side of the printer.
Figure 7:
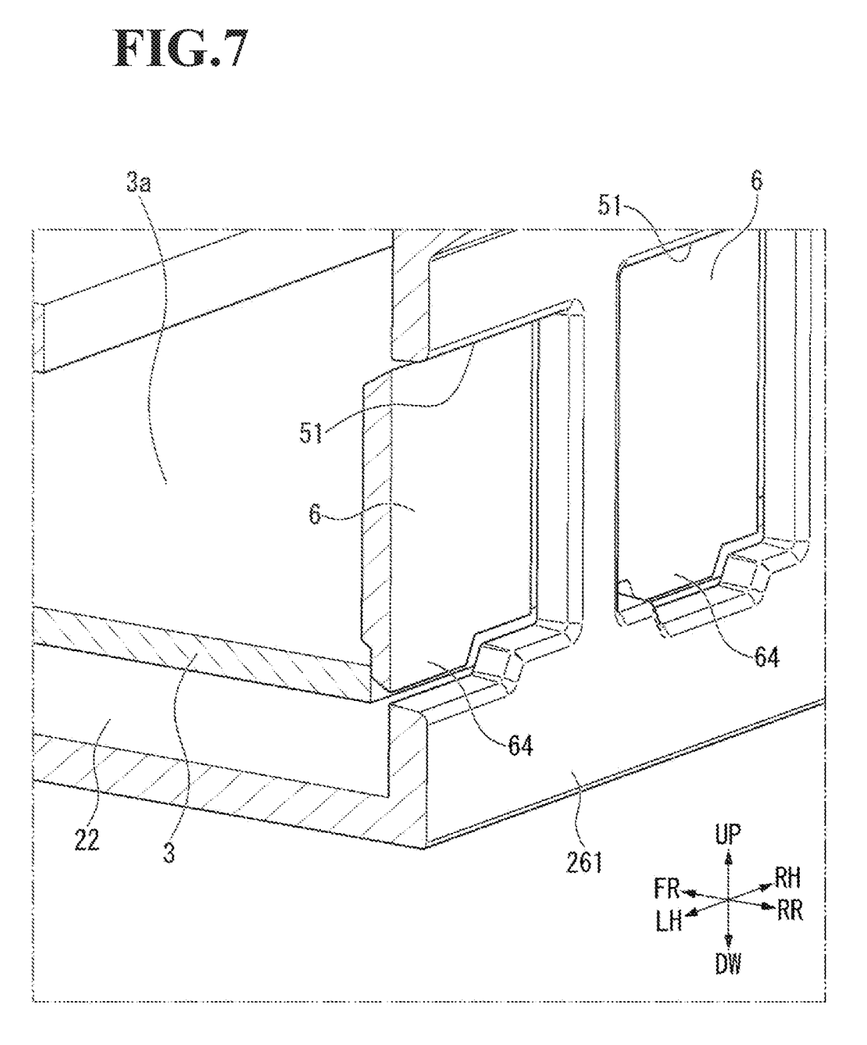
FIG. 7 is a sectional perspective view for illustrating a state of the lower cover and the board taken along the line B-B of FIG. 5 and seen from the rear side of the printer.

FIG. 5 is a perspective view for illustrating the lower cover 22 and the board 3 in a state of the printer 1 illustrated in FIG. 4. The dotted lines in FIG. 5 indicate the lower cover 22. FIG. 6 is a sectional perspective view for illustrating a state of the lower cover 22 and the board 3 taken along the line B-B of FIG. 5 and seen from the front side FR of the printer 1. FIG. 7 is a sectional perspective view for illustrating a state of the lower cover 22 and the board 3 taken along the line B-B of FIG. 5 and seen from the rear side RR of the printer 1.

The lower cover 22 is provided on the lower side DW of the housing main body 21, and is placed on the placement surface G. The lower cover 22 includes a board cover 24 and the connector cover 25.

[Board Cover 24]

The board cover 24 is mounted to the housing main body 21 from the lower side DW. The board cover 24 covers the board 3 accommodated in the casing 2. The board cover 24 includes a board cover bottom 240 and a board cover side wall 241.

The board cover bottom 240 is a plate-like member that has a substantially rectangular shape and is provided on the lower side DW of the board cover 24. The board cover bottom 240 has the same shape as that of the housing main body 21 in plan view. The board cover bottom 240 includes a board cover groove 243 formed on the rear side RR.

As illustrated in FIG. 5, the board cover groove 243 is formed on the rear side RR of the board cover bottom 240. It is preferred that the board cover groove 243 be formed so as to be slightly longer in the front-and-rear direction than a connector 71a and a connector 72a that are respectively provided at ends of the cables 71 and 72 described above. When seen from the up-and-down direction, the board cover groove 243 is formed into a substantially U shape including a bottom edge portion 243a on the front side FR and including side edge portions 243b in the right-and-left direction. A width of the board cover groove 243 in the right-and-left direction is not particularly limited. However, in this embodiment, the width of the board cover groove 243 in the right-and-left direction is substantially equal to the width of the cable connection groove 215. The board cover bottom 240 is formed to have a length in the front-and-rear direction that allows the board 3 to be arranged within a sufficient space more on the front side FR than the board cover groove 243 under a state in which the board cover groove 243 is formed on the rear side RR. The board cover groove 243 is not an essential component.

As illustrated in FIG. 5, the board cover side wall 241 is formed along an edge portion 240a of the board cover bottom 240 excluding the board cover groove 243. The board cover side wall 241 is fixed to the housing main body 21 by a publicly-known method such as a bolt or an adhesive, and thus the housing main body 21 and the lower cover 22 are integrated with each other. The board cover side wall 241 is set to have a height capable of covering, for example, a portion of the board 3 protruding to the lower side DW when the board 3 is mounted to the housing main body 21.

[Connector Cover 25]

As illustrated in FIG. 4 or FIG. 5, the connector cover 25 is provided on the rear side RR of the lower cover 22. The connector cover 25 covers the cable connection groove 215 formed in the rear wall 212 of the housing main body 21. The connector cover 25 includes a cover main body 26 and first opening cover portions 60.

Here, in the front-and-rear direction being the direction of inserting and removing the cable, the connector cover 25 covers the cable connection groove 215 formed in the rear wall 212 of the housing main body 21. In the following description, the front side FR with respect to the connector cover 25 is also referred to as a cable insertion side. Further, the rear side RR with respect to the connector cover 25 is also referred to as a cable removal side. It is not always required that the connector cover 25 be arranged on the rear side RR of the housing main body 21, and arrangement of the connector cover 25 is not limited to that described in this embodiment.

[Cover Main Body 26]

As illustrated in FIG. 4, the cover main body 26 includes the opening cover mounting portion 261, side portions 262, and an upper wall portion 263. The opening cover mounting portion 261 is connected at a lower end portion thereof to the bottom edge portion 243a of the board cover groove 243, and extends upright to the upper side UP. The side portions 262 are each connected at a lower end portion thereof to the side edge portion 243b formed in the right-and-left direction of the board cover groove 243, and extend upright to the upper side UP. The upper wall portion 263 is fixed to an upper end portion of the opening cover mounting portion 261 and upper end portions of the side portions 262 so as to cover the upper side UP of the cover main body 26. With this configuration, the cover main body 26 defines a space S3 for covering connector portions of the cables described above. Accordingly, when the cables 71 and 72 are inserted into the connector unit 30 of the board 3, the cover main body 26 covers, within the space S3, the connectors 71a and 72a that are respectively provided at the ends of the cables 71 and 72, thereby being capable of preventing, for example, dust and dirt from easily entering the printer.

The opening cover mounting portion 261 of the cover main body 26 includes a power supply opening portion 50, a plurality of first interface opening portions 51, and a second interface opening portion 52.

The power supply opening portion 50 is an opening portion passing through the cover main body 26 in the front-and-rear direction. The power supply opening portion 50 has a size allowing the power cable 71 illustrated in FIG. 5 to be removably inserted through the power supply opening portion 50. The shape and size of the power supply opening portion 50 can be freely modified in accordance with a connection surface of a power supply connector 31 to which the power cable 71 is connectable. The power supply opening portion 50 is arranged in the opening cover mounting portion 261 so that the connection surface of the power supply connector 31 overlaps the power supply opening portion 50 when seen from the rear side RR in the front-and-rear direction. Further, a member such as a cover is not provided for covering the power supply opening portion 50. Accordingly, through the power supply opening portion 50, the power supply connector 31 is exposed. Through the power supply opening portion 50, the power supply connector 31, which is provided more on the front side FR than the opening cover mounting portion 261 when seen from the rear side RR in the front-and-rear direction, is exposed.

The first interface opening portions 51 are each an opening portion passing through the cover main body 26 in the front-and-rear direction. The first interface opening portion 51 has a size allowing the interface cable 72, which is described later, to be inserted through the first interface opening portion 51. The shape and size of the first interface opening portion 51 can be freely modified in accordance with a connection surface of an interface connector 32 to which the interface cable 72 is connectable. The first interface opening portion 51 is arranged in the opening cover mounting portion 261 so that the connection surface of the interface connector 32 overlaps the first interface opening portion 51 when seen from the rear side RR in the front-and-rear direction. The number of the first interface opening portions 51 is not particularly limited. Only one first interface opening portion 51 may be formed, or a plurality of first interface opening portions 51 may be formed. In this embodiment, two first interface opening portions 51 are formed more on the left side LH than the power supply opening portion 50. The first interface opening portion 51 can be formed in accordance with the number of the interface connector 32 mounted on the board 3 of the printer 1.

The second interface opening portion 52 is an opening portion passing through the cover main body 26 in the front-and-rear direction. The second interface opening portion 52 has a size allowing the interface cable 72, which is described later, to be inserted through the second interface opening portion 52. The shape and size of the second interface opening portion 52 can be freely modified in accordance with the connection surface of the interface connector 32 to which the interface cable 72 is connectable. The number of the second interface opening portions 52 is not particularly limited, and a plurality of second interface opening portions 52 may be formed. Further, the second interface opening portion 52 is not an essential component. In this embodiment, one second interface opening portion 52 is formed more on the right side RH than the power supply opening portion 50.

Here, the connector cover 25 further includes a second opening cover portion 65. The second opening cover portion 65 covers the second interface opening portion 52. However, as illustrated in FIG. 2, the second opening cover portion 65 is removed during manufacture. Accordingly, through the second interface opening portion 52, the interface connector 32 is exposed. The interface connector 32 is provided more on the front side FR than the opening cover mounting portion 261 when seen from the rear side RR in the front-and-rear direction. The second opening cover portion 65 has the same configuration as that of each of the first opening cover portions 60 to be described later.

In the opening cover mounting portion 261, the two first interface opening portions 51, the power supply opening portion 50, and the second interface opening portion 52 are arrayed in the stated order in the right-and-left direction. However, the order of the above-mentioned opening portions is not particularly limited. The above-mentioned opening portions are formed in the opening cover mounting portion 261 in accordance with the order of the connectors of the connector unit on the board.

[First Opening Cover Portion 60]

The first opening cover portions 60 each cover the first interface opening portion 51. The first opening cover portion 60 is provided slightly more on the front side FR than the opening cover mounting portion 261 in the front-and-rear direction. A clearance between the first opening cover portion 60 and the opening cover mounting portion 261 in the front-and-rear direction is set to be as small as possible, thereby being capable of further preventing entry of, for example, dust and dirt through the first interface opening portion 51. The first opening cover portions 60 of the same number as that of the first interface opening portions 51 are formed. A width of the first opening cover portion 60 in the front-and-rear direction is substantially equal to a width of the opening cover mounting portion 261. Further, the first opening cover portion 60 is formed so as to have substantially the same shape and size as those of the first interface opening portion 51. Accordingly, the cover main body 26 can easily form the first opening cover portions 60 during manufacture. It is only required that the first opening cover portions 60 each cover at least a part of the first interface opening portion 51. The first opening cover portions 60 each include a first coupling portion 61 formed on the upper side UP, and a stopper 64 formed on the lower side DW. In this embodiment, the second opening cover portion 65 has the same configuration as that of the first opening cover portion 60, and includes the first coupling portion 61 and the stopper 64. Herein, description of the second opening cover portion 65 is omitted.

[First Coupling Portion 61]

The first coupling portion 61 is formed in a portion of the first opening cover portion 60, and couples the first opening cover portion 60 and the opening cover mounting portion 261 of the cover main body 26 to each other. A shape of the first coupling portion 61 is not particularly limited. In this embodiment, the first coupling portion 61 is formed on the upper side UP of the first opening cover portion 60. However, it is only required that the first coupling portion 61 be formed in a portion of the first opening cover portion 60, and a formation position of the first coupling portion 61 is not particularly limited. A width of the first coupling portion 61 in the front-and-rear direction is set to, for example, about 2.5 mm. The first coupling portion 61 includes a notched portion 62 and a thin portion 63.

As illustrated in FIG. 6, the notched portion 62 is a portion obtained by forming a substantially V-shaped notch in a back surface 61*b* of the first coupling portion 61 from the rear side RR to the front side FR along the right-and-left direction. The shape of the notched portion 62 is not particularly limited. In this embodiment, a notch width of the notched portion 62 is set so that the shortest distance from the deepest portion of the notched portion 62 to a front surface 61*a* of the first coupling portion 61 on the front side FR is about 1 mm. The notch width of the notched portion 62 is not particularly limited. However, it is preferred that the notch width of the notched portion 62 be designed so as to prevent the thin portion 63 from splitting in a manufacturing stage, but allow the thin portion 63 to easily split when a worker applies a pushing force (external force) to the first opening cover portion 60 toward the front side FR before product shipment.

[Thin Portion 63]

As illustrated in FIG. 6, the thin portion 63 is a portion having a smaller thickness in the front-and-rear direction than the other portions of the first coupling portion 61. Specifically, the thin portion 63 is a thin portion formed more on the front side FR than the notched portion 62 of the first coupling portion 61. The thin portion 63 is formed on the front surface 61a of the first coupling portion 61 on the front side FR. The thickness of the thin portion 63 in the front-and-rear direction can be freely modified in accordance with the notched portion 62. When the pushing force (external force) is applied to the first opening cover portion 60 toward the front side FR as described above, the first opening cover portion 60 is swung on the first coupling portion 61 along the front-and-rear direction. At this time, a shearing force acts more on the thin portion 63 having a smaller thickness in the front-and-rear direction than on the first coupling portion 61. Accordingly, the first coupling portion 61 is split from the thin portion 63.

[Stopper 64]

As illustrated in FIG. 6, the stopper 64 is provided on the lower side DW of the first opening cover portion 60. Accordingly, the stopper 64 and the first coupling portion 61 are formed on both sides of the first opening cover portion 60 across a center axis passing a center of the first opening cover portion 60 in the up-and-down direction. The stopper 64 protrudes from a lower end portion of the first opening cover portion 60 to the lower side DW. When the pushing force (external force) is applied to the first opening cover portion 60 toward the front side FR (insertion side) in the front-and-rear direction, the first opening cover portion 60 is engaged with a rear edge portion 3p formed on the rear side RR of the board 3.

The casing 2 has at least a space 51 and a space S2 that are defined inside the casing 2 by, for example, a plurality of partition plates provided inside the casing 2. The space S2 is defined on the lower side DW of the casing 2.

The space S1 is a space having a size allowing the printing unit 4, which is described later, to be accommodated inside the space S1. In this embodiment, the space 51 is an enclosed space defined by the partition plates, the upper cover 20, and the housing main body 21. It is preferred that the space 51 be defined more on the upper side UP in the up-and-down direction than an upper edge 215a of the cable connection groove 215. With this configuration, the housing main body 21 can keep an enclosed accommodation space of the space 51.

The space S2 is a space having such a size as to accommodate the board 3 therein. The space S2 is defined by a configuration in which the lower-end opening portion 21b of the housing main body 21 is covered with the board cover 24 of the lower cover 22 and the cable connection groove 215 of the rear wall 212 is covered with the connector cover 25 of the lower cover 22. With the above-mentioned configuration, the space S2 forms an enclosed space. The casing 2 is not limited to that described in this embodiment. The casing 2 may have a plurality of spaces defined by a plurality of partition plates.

[Board 3]

The board 3 is a circuit board on which a plurality of electronic components are mounted. The board 3 outputs an electric signal or a control signal in response to, for example, input from a button or an external device (not shown), or outputs a control signal so as to comprehensively control various kinds of functions of the printer 1. The board 3 is formed into a rectangular board shape having a pair of short sides in the front-and-rear direction corresponding to a long-side direction, and having a pair of long sides in the right-and-left direction corresponding to a short-side direction. The connector unit 30 is provided on an upper surface 3a of the board 3. Further, when the pushing force (external force) is applied to the first opening cover portion 60 toward the front side FR in the front-and-rear direction, the rear edge portion 3p of the board 3 on the rear side RR is engaged with the stopper 64.

[Connector Unit 30]

The connector unit 30 includes, for example, the power supply connector 31 and the interface connector 32. The connector unit 30 is not limited to that described in this embodiment. The connector unit 30 may include only one connector, or may include a plurality of connectors.

[Power Supply Connector 31]

The power supply connector 31 is provided on the upper surface 3a of the board 3. The power supply connector 31 is electrically connected to the board 3 via, for example, an electrical connection member (not shown). The power cable 71 can be connected to (inserted into and removed from) the power supply connector 31. The power supply connector 31 is arranged on the rear side RR of the board 3 under a state in which the connection surface, to which the power cable 71 is connectable, is directed to the rear side RR. Further, the power supply connector 31 is arranged so as to be exposed and visible through the power supply opening portion 50 when seen from the rear side RR in the front-and-rear direction.

[Interface Connector 32]

Similarly to the power supply connector 31, the interface connector 32 is provided on the upper surface 3a of the board 3. The interface connector 32 is electrically connected to the board 3 via, for example, an electrical connection member (not shown). The interface cable 72 can be connected to (inserted into and removed from) the interface connector 32. The interface connector 32 is, for example, a Universal Serial Bus (USB) connector. Further, in this case, the interface cable 72 is a USB connector. The interface connector 32 is arranged on the rear side RR of the board 3 under a state in which the connection surface, to which the interface cable 72 is connectable, is directed to the rear side RR. Further, the interface connector 32 is arranged so as to be exposed and visible through the second interface opening portion 52 when seen from the rear side RR in the front-and-rear direction. The interface connector 32 is not a particularly essential component. When the printer 1 performs wireless communication through, for example, Bluetooth (trademark), the interface connector 32 is not mounted on the board 3. The interface cable 72 is not limited to a USB connector. As the interface cable 72, for example, a Local Area Network (LAN) connector or an Ethernet standard connector can be used.

The connector unit 30 is provided on the short side (one side) of the board 3 on the rear side RR in the front-and-rear direction, which is close to the cover main body 26. Further, the connector unit 30 is arranged so as to be aligned along the short side of the board 3 on the rear side RR in the front-and-rear direction. In this embodiment, the interface connector 32 is arranged more on the right side RH than the power supply connector 31. Further, on the left side LH of the power supply connector 31, the board 3 has a space allowing a plurality of interface connectors 32 to be further mounted in the space. Under this state, the power supply connector 31 is mounted on the board 3 so as to be exposed through the power supply opening portion 50 when seen from the rear side RR in the front-and-rear direction. Further, the interface connector 32 is mounted on the board 3 so as to be exposed through the second interface opening portion 52 when seen from the rear side RR in the front-and-rear direction. Intervals between connectors to be arranged are not particularly limited. However, it is desired that the connectors be arranged at intervals that are set in consideration of causing no noise when a plurality of cables respectively corresponding to the connectors are inserted into the connectors from an outside.

[Printing Unit 4]

As illustrated in FIG. 2, the printing unit 4 includes a platen roller 40, a thermal head 41, and a cutter unit 42.

The platen roller 40 is a rubber roller extending in the right-and-left direction. The platen roller 40 is provided in a front end part of the housing main body 21 (part located closer to the delivery slot 23). The platen roller 40 is rotatable about an axis O1 along the right-and-left direction, and is rotated in accordance with a driving force of a driving motor (not shown) when the recording sheet P is conveyed.

The thermal head 41 is provided in a part of an inside of the upper cover 20 located closer to the delivery slot 23. The thermal head 41 includes a plurality of heating elements linearly arrayed along the right-and-left direction. The thermal head 41 is fixed to a front end portion of the upper cover 20 under a state in which the heating elements are directed downward.

The platen roller 40 and the thermal head 41 are opposed to each other in the up-and-down direction through intermediation of the recording sheet P. When the upper cover 20 is at the closed position, the thermal head 41 is held in close contact with the platen roller 40. The recording sheet P is allowed to pass through a space between the platen roller 40 and the thermal head 41 along with rotation of the platen roller 40. A heating pattern of the heating elements of the thermal head 41 is controlled based on a signal output from the board 3. When heat of the heating elements is transferred to the print surface of the recording sheet P, information (such as characters and figures) associated with the heating pattern is printed on the recording sheet P.

[Cutter Unit 42]

As illustrated in FIG. 3, the cutter unit 42 includes a fixed blade 420 and a movable blade 421. The cutter unit 42 causes a moving mechanism (not shown) to reciprocate the movable blade 421 with respect to the recording sheet P, and sandwiches the recording sheet P between the movable blade 421 and the fixed blade 420, to thereby form a cut in the recording sheet P. In the cutter unit 42, a recessed portion (not shown) may be formed in a blade edge of the fixed blade 420 or a blade edge of the movable blade 421. Owing to provision of the recessed portion, when the cutter unit 42 cuts the recording sheet P, an uncut portion is left at a portion of the recording sheet P opposed to the recessed portion (so-called partial cutting). The number of the recessed portion is not particularly limited, and a plurality of recessed portions may be formed. Further, the recessed portion is not an essential component.

As illustrated in FIG. 3, the fixed blade 420 is arranged between the platen roller 40 and the delivery slot 23 in the housing main body 21 and on a side opposite to the print surface of the recording sheet P. The fixed blade 420 is formed into a plate-like shape extending in the right-and-left direction. A shape of the blade edge of the fixed blade 420 is not particularly limited. For example, there can be used a fixed blade having a blade edge of a conventionally-known shape such as a V shape extending in the up-and-down direction. The fixed blade 420 is fixed through predetermined means by a support portion (not shown) provided in the housing main body 21.

As illustrated in FIG. 3, the movable blade 421 is arranged between the thermal head 41 and the delivery slot 23 in the upper cover 20 and on the print surface side of the recording sheet P. The movable blade 421 is formed into a plate-like shape extending in the right-and-left direction. Further, the movable blade 421 is fixed through predetermined means by a support portion (not shown) provided in the housing main body 21. Moreover, the movable blade 421 is reciprocated in an advancing direction B by the moving mechanism (not shown).

[Operations]

Next, as operations of the above-mentioned printer 1, a method of manufacturing the printer 1 is described.

Figure 8:
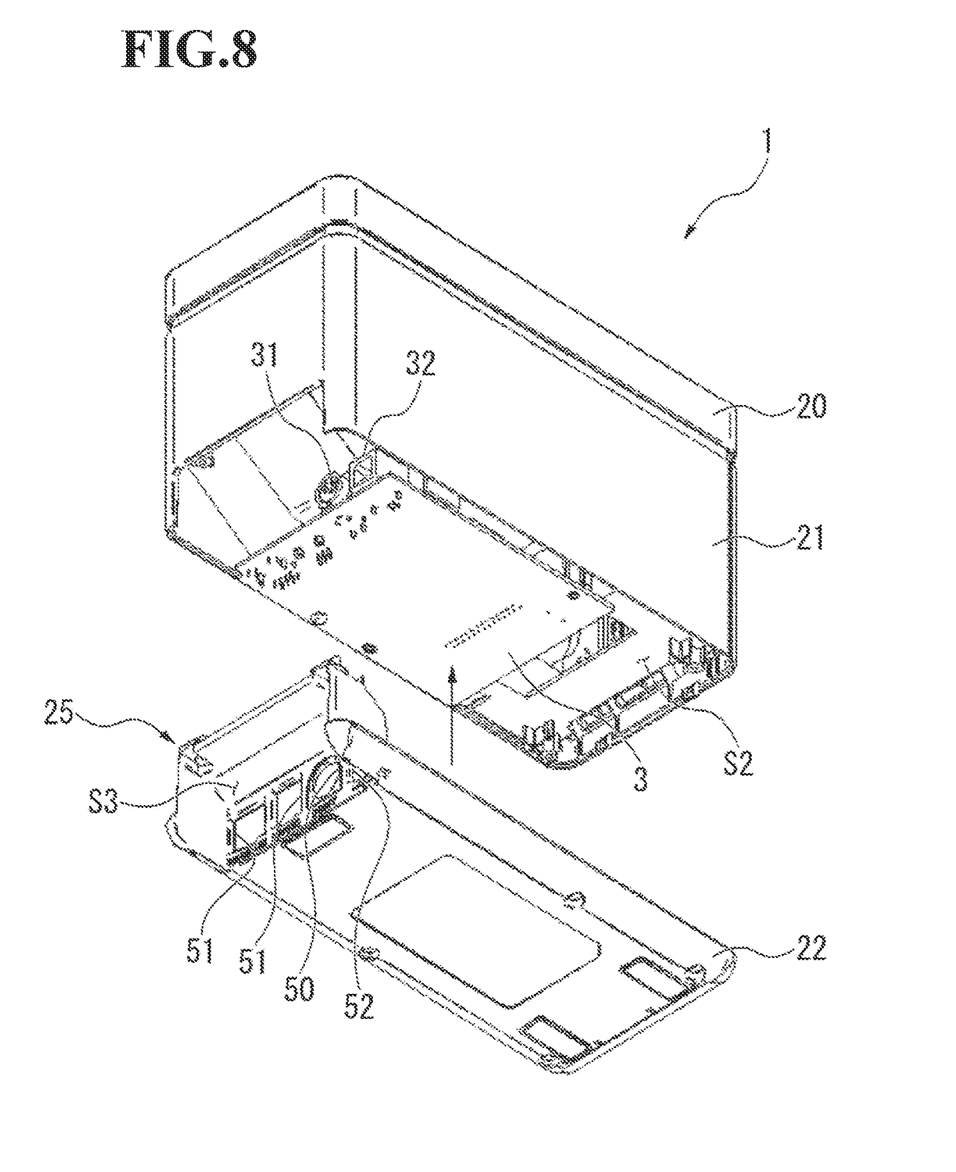
FIG. 8 is a perspective view for illustrating a state in which the board is mounted to a housing main body of the printer and the lower cover is removed.

FIG. 8 is a perspective view for illustrating a state in which the board 3 is mounted to the housing main body 21 of the printer 1 and the lower cover 22 is removed.

First, as illustrated in FIG. 8, a worker integrates the upper cover 20 and the housing main body 21 of the casing 2 with each other under a state in which the printing unit 4 is provided in the housing main body 21 of the printer 1. Then, the board 3 is mounted to the housing main body 21. The board 3 is accommodated in the space S3 to be defined on the lower side DW of the casing 2. At this time, the connector unit 30, which is arrayed along the short side of the board 3 on the rear side RR in the front-and-rear direction, is mounted to the housing main body 21 so as to be directed to the rear side RR.

Next, in order to removably insert cables compatible with the connector unit 30 provided on the board 3, a worker removes covers of the connector cover 25 that cover the opening portions, respectively. In this embodiment, no cover is provided for covering the power supply opening portion 50. Further, the first interface opening portions 51 are covered with the first opening cover portions 60, respectively. However, the board 3 does not include connectors into which cables are removably inserted through the first interface opening portions 51. Accordingly, the first opening cover portions 60 are not removed from the first interface opening portions 51.

The board 3 includes the interface connector 32 into which the interface cable 72 is removably inserted through the second interface opening portion 52. Accordingly, a worker removes, from the second interface opening portion 52, the second opening cover portion 65 that covers the second interface opening portion 52 formed in the connector cover 25. Specifically, the second opening cover portion 65 has the same configuration as that of the first opening cover portion 60 as described above. Accordingly, when the pushing force (external force) is applied to the second opening cover portion 65 toward the front side FR, the second opening cover portion 65 is swung on the first coupling portion 61. At this time, a shearing force acts more on the thin portion 63 having a smaller thickness in the front-and-rear direction than on the first coupling portion 61. Accordingly, the first coupling portion 61 is split from the thin portion 63. The second opening cover portion 65 is thus removed from the connector cover 25. The pushing force (external force) may be applied in the front-and-rear direction only once or a plurality of times. Further, similarly to the first opening cover portion 60, the second opening cover portion 65 is provided slightly more on the front side FR than the opening cover mounting portion 261 in the front-and-rear direction. Accordingly, a worker can easily push the second opening cover portion 65 to the front side FR.

Next, under a state in which the board 3 is accommodated in the space S3 of the casing 2 and the second interface opening portion 52 is opened, the lower cover 22 is mounted to the housing main body 21 from the lower side DW.

The lower cover 22 is mounted so that the connector cover 25 is directed to the rear side RR. The lower cover 22 covers the lower-end opening portion 21b of the housing main body 21, and covers the cable connection groove 215 of the rear wall 212 of the housing main body 21.

The opening cover mounting portion 261 of the cover main body 26 of the connector cover 25 of the lower cover 22 is arranged on the rear side RR of each of the connectors of the board 3. Here, it is preferred that a clearance between the opening cover mounting portion 261 and each of the connectors 31 and 32 be set so as to allow the connector 71a of the cable 71 or the connector 72a of the cable 72 to be connected to the connector 31 or the connector 32 immediately after being inserted through the opening portion. In this embodiment, the power supply opening portion 50 is arranged on the rear side RR of the power supply connector 31 of the board 3, and the power supply connector 31 is exposed through the power supply opening portion 50. The second interface opening portion 52 is arranged on the rear side RR of the interface connector 32 of the board 3, and the interface connector 32 is exposed through the second interface opening portion 52. The lower cover 22 is mounted to and integrated with the housing main body 21. Through the above-mentioned manufacturing process, the printer 1 is produced.

In this embodiment, the connector cover 25 of the printer 1 includes the power supply opening portion 50, the first interface opening portions 51, and the second interface opening portion 52. Accordingly, without providing a plurality of connector covers 25 for the connectors mounted on the board 3, in accordance with various types of connectors mounted on the board 3, cables that are to be respectively connected to the connectors can be inserted through the opening portions and inserted into the connectors. In this embodiment, there is no need to prepare different connector covers for various types of connectors mounted on the board 3. Accordingly, the number of parts of the printer 1 can be reduced.

Further, in this embodiment, each of the first interface opening portions 51, through which the cable is not inserted, is covered with the first opening cover portion 60. Accordingly, the first opening cover portion 60 closes the first interface opening portion 51, and thus can prevent entry of, for example, dust and dirt.

Further, in this embodiment, no cover is provided for covering the power supply opening portion 50 to which the power supply connector 31 is arranged. Accordingly, without the need to remove a cover, the power cable 71 can be easily inserted into the power supply connector 31 that is typically mounted on the board 3.

Further, in this embodiment, when a worker applies the pushing force (external force) to the second opening cover portion 65, the second opening cover portion 65 can be removed from the connector cover 25. Accordingly, when there is the interface cable 72 that is intended to be inserted through the second interface opening portion 52, the second opening cover portion 65 can be removed from the connector cover 25 after the connector cover 25 is formed.

Further, in this embodiment, the first opening cover portion 60 and the second opening cover portion 65 each include the thin portion 63 in the first coupling portion 61. Accordingly, when the first opening cover portion 60 or the second opening cover portion 65 is removed, without use of, for example, a cutting tool, a worker can easily remove the first opening cover portion 60 or the second opening cover portion 65 by hand.

Further, in this embodiment, the first opening cover portion 60 and the second opening cover portion 65 each include the stopper 64. Accordingly, even when the first opening cover portion 60 or the second opening cover portion 65 is pushed to the front side FR, the stopper 64 is engaged with the rear edge portion 3p of the board 3, thereby being capable of preventing the first opening cover portion 60 or the second opening cover portion 65 from being removed. Further, the stopper 64 is formed on a side opposite to the first coupling portion 61 across the center axis passing the center of the first opening cover portion 60. Therefore, the first opening cover portion 60 or the second opening cover portion 65 can be inhibited from moving to the front side FR in the front-and-rear direction to cause splitting of the first coupling portion 61 from the thin portion 63.

Further, in this embodiment, the thin portion 63 is formed on the front surface 61a of the first coupling portion 61 on the front side FR. Accordingly, even when a sharp projection such as a bun is formed at the time of removal of the first opening cover portion 60 or the second opening cover portion 65, the sharp projection is less liable to project more to the rear side RR than the cover main body 26 of the connector cover 25. Therefore, there can be eliminated a risk in that a worker is injured on his or her hand by a bun during use of the printer 1.

The present invention is not limited by the embodiment described above. Further, the components in the embodiment encompass components easily conceived by a person skilled in the art, or substantially the same components, that is, so-called equivalents. In addition, the components disclosed in the embodiment can be combined with each other as appropriate.

Hereinabove, the embodiment of the present invention has been described in detail with reference to the accompanying drawings. However, specific structures of the present invention are not limited to the embodiment and encompass design modifications and the like without departing from the gist of the present invention. Further, the components described in the embodiment described above and modification examples described below may be configured in combination with each other as appropriate.

(Modification Example)

The first opening cover portion in the present invention may be formed so as to be larger than the first interface opening portion, and may be formed so as to overlap the entire first interface opening portion when seen from the front-and-rear direction. With this configuration, a clearance between the first opening cover portion and the first interface opening portion is further reduced, thereby being capable of further preventing entry of, for example, dust and dirt.

Further, the first opening cover portion in the embodiment described above may include two or more first coupling portions. With this configuration, the first opening cover portion is fixed to the cover main body more firmly. Accordingly, there can be reduced a risk in that the first opening cover portion slips off the cover main body due to contact with a hand of a worker or vibration. Further, the first opening cover portion may further include a second coupling portion that couples the first opening cover portion and the cover main body to each other. The first opening cover portion includes the second coupling portion that is formed on a side opposite to the first coupling portion across the center axis passing the center of the first opening cover portion. Therefore, the first coupling portion and the second coupling portion are formed on both sides of the first opening cover portion across the center axis passing the center of the first opening cover portion. With this configuration, the first opening cover portion is fixed to the cover main body more firmly. Accordingly, the same effects as those described above can be obtained. Further, the second coupling portion may be formed so as to have a sectional area smaller than that of the first coupling portion. Similarly to the first opening cover portion, the second opening cover portion may also have the same configuration as that described above.

In this embodiment, as the printer, a thermal printer is described as an example, but the printer is not particularly limited. The present invention is applicable to various types of printers.

In any mode described above, according to the printer of the present invention, the cover that is compatible with a plurality of interfaces can prevent entry of dust and dirt into the printer.

What is claimed is:

1. A printer, comprising:
   a board including a connector unit that includes at least a power supply connector into which a power cable is to be removably inserted; and
   a housing including:
      a housing main body that accommodates the board and includes a cable connection groove through which the power cable is inserted in an inserting and removing direction of the power cable; and
      a connector cover configured to cover the cable connection groove,
   wherein the connector cover includes:
      a cover main body including a power supply opening portion passing through the cover main body in the inserting and removing direction, and a first interface opening portion passing through the cover main body in the inserting and removing direction; and
      a first opening cover portion configured to cover at least a part of the first interface opening portion,
   wherein the first opening cover portion includes a first coupling portion configured to couple the first opening cover portion and the cover main body to each other.

2. The printer according to claim 1,
   wherein the connector unit further includes an interface connector into which an interface cable is removably inserted in the inserting and removing direction, and
   wherein the cover main body of the connector cover further includes a second interface opening portion passing through the cover main body in the inserting and removing direction.

3. The printer according to claim 2,
   wherein, from the second interface opening portion, a second opening cover portion configured to cover the second interface opening portion formed in the connector cover is removed during manufacture, and
   wherein, through the second interface opening portion, the interface connector is exposed when seen from the inserting and removing direction.

4. The printer according to claim 2, wherein the connector unit is arrayed on one side of the board close to the cover main body and along the one side.

5. The printer according to claim 1, wherein the power supply connector is exposed through the power supply opening portion when seen from the inserting and removing direction.

6. The printer according to claim 1, wherein the connector cover includes at least two first interface opening portions and at least two first opening cover portions.

7. The printer according to claim 1, wherein the first coupling portion includes a thin portion having a smaller thickness in the inserting and removing direction than other portions of the first coupling portion.

8. The printer according to claim 7, wherein the first coupling portion is split from the thin portion when an external force is applied to the first opening cover portion.

9. The printer according to claim 1, wherein no cover is provided for covering the power supply opening portion.

10. The printer according to claim 1, wherein the first opening cover portion includes a stopper that is engaged with an edge portion of the board when an external force is applied to the first opening cover portion to an insertion side in the inserting and removing direction.

11. The printer according to claim 10, wherein the stopper and the first coupling portion are formed on both sides of the first opening cover portion across a center axis passing a center of the first opening cover portion.

12. The printer according to claim 1, wherein the first opening cover portion includes two or more first coupling portions.

13. The printer according to claim 1,
   wherein the first opening cover portion further includes a second coupling portion configured to couple the first opening cover portion and the cover main body to each other, and
   wherein the first coupling portion and the second coupling portion are formed on both sides of the first opening cover portion across the center axis passing the center of the first opening cover portion.

14. The printer according to claim 1, wherein the first opening cover portion is formed so as to be larger than the first interface opening portion, and formed so as to overlap the entire first interface opening portion when seen from the inserting and removing direction.

* * * * *